United States Patent
Whitcher et al.

(10) Patent No.: US 11,516,277 B2
(45) Date of Patent: Nov. 29, 2022

(54) SCRIPT-BASED TECHNIQUES FOR COORDINATING CONTENT SELECTION ACROSS DEVICES

(71) Applicant: Oracle International Corporation, Redwood Shores, CA (US)

(72) Inventors: Kevin Matthew Whitcher, Boulder, CO (US); David Michael Mitchell, Boulder, CO (US); Robin Layne Opie, Lafayette, CO (US); Thomas Joseph Waits, Colorado Springs, CO (US); Rong Xia, Denver, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/014,689

(22) Filed: Sep. 8, 2020

(65) Prior Publication Data
US 2021/0084097 A1 Mar. 18, 2021

Related U.S. Application Data

(60) Provisional application No. 62/900,484, filed on Sep. 14, 2019.

(51) Int. Cl.
*G06F 17/10* (2006.01)
*H04L 67/02* (2022.01)
(Continued)

(52) U.S. Cl.
CPC ............ *H04L 67/02* (2013.01); *G06F 16/958* (2019.01); *G06F 40/14* (2020.01)

(58) Field of Classification Search
CPC ......... H04L 67/02; G06F 16/958; G06F 40/14
See application file for complete search history.

(56) References Cited

U.S. PATENT DOCUMENTS

| | | | |
|---|---|---|---|
| 6,108,637 A | 8/2000 | Blumenau | |
| 6,115,680 A | 9/2000 | Coffee et al. | |

(Continued)

FOREIGN PATENT DOCUMENTS

| | | | | |
|---|---|---|---|---|
| CA | 3068620 A1 | * | 1/2019 | ......... G06F 16/9535 |
| WO | WO-2018020080 A1 | * | 2/2018 | ......... G06Q 30/0203 |

OTHER PUBLICATIONS

Behance: Curated Galleries, WELOVEAD beta, Web Design Served, Behance Served Sited, Available online at: https://www.webdesignserved.com/gallery/WELOVEAD-beta/517326, May 20, 2010, 15 pages.

(Continued)

*Primary Examiner* — Shahid K Khan
(74) *Attorney, Agent, or Firm* — Kilpatrick Townsend & Stockton LLP (57) ABSTRACT

Methods and systems are disclosed for coordinating content selection across devices. A user device may transmit a request for webpage content and in response, may receive response communications that include the webpage content, embedded content, and a script. The user device may retrieve a device identifier initially generated by a remote system from a locally stored data object. The user device can detect, using the script, whether at least part of the embedded content is being presented within a portion of the webpage that is displayed on a screen of the user device. The user device may then transmit a report communication to a remote ID-graph system that includes the device identifier and an indication as to whether the at least part of the embedded content was presented within the portion of the webpage that was displayed on the screen of the user device.

19 Claims, 4 Drawing Sheets

(51) Int. Cl.
   *G06F 16/958*          (2019.01)
   *G06F 40/14*           (2020.01)

(56) References Cited

U.S. PATENT DOCUMENTS

| | | | |
|---|---|---|---|
| 6,230,204 | B1 | 5/2001 | Fleming, III |
| 6,327,619 | B1 | 12/2001 | Blumenau |
| 6,418,470 | B2 | 7/2002 | Blumenau |
| 6,519,571 | B1 | 2/2003 | Guheen et al. |
| 6,868,437 | B1 | 3/2005 | Gary |
| 7,263,497 | B1 | 8/2007 | Wiser et al. |
| 7,310,609 | B2 | 12/2007 | Middleton, III et al. |
| 7,376,714 | B1 | 5/2008 | Gerken |
| 7,386,473 | B2 | 6/2008 | Blumenau |
| 7,386,517 | B1 | 6/2008 | Donner |
| 7,613,635 | B2 | 11/2009 | Blumenau |
| 7,660,737 | B1 | 2/2010 | Lim et al. |
| 7,716,326 | B2 | 5/2010 | Blumenau |
| 7,756,974 | B2 | 7/2010 | Blumenau |
| 7,917,755 | B1 | 3/2011 | Giliyaru et al. |
| 7,986,695 | B1 | 7/2011 | Kodeboyina et al. |
| 8,108,245 | B1 | 1/2012 | Hosea et al. |
| 8,131,799 | B2 | 3/2012 | Landsman et al. |
| 8,190,604 | B2 | 5/2012 | Wen et al. |
| 8,255,491 | B1 | 8/2012 | Arzur |
| 8,260,846 | B2 | 9/2012 | Lahav |
| 8,266,115 | B1 | 9/2012 | Park et al. |
| 8,386,314 | B2 | 2/2013 | Kirkby et al. |
| 8,508,532 | B1 | 8/2013 | Logan et al. |
| 8,527,347 | B2 | 9/2013 | Pulijala et al. |
| 8,627,288 | B2 | 1/2014 | Kimball et al. |
| 8,799,814 | B1 | 8/2014 | Bryc et al. |
| 8,880,996 | B1 | 11/2014 | Deshpande et al. |
| 9,087,216 | B2 | 7/2015 | LaFever et al. |
| 9,270,650 | B2 | 2/2016 | Johnsen et al. |
| 9,274,932 | B2 | 3/2016 | Crossley |
| 9,282,048 | B1 | 3/2016 | Fichter et al. |
| 9,317,392 | B2 | 4/2016 | Lawbaugh et al. |
| 9,414,100 | B2 | 8/2016 | Van Veldhuisen |
| 9,509,489 | B1 | 11/2016 | Ibison |
| 9,514,479 | B2 | 12/2016 | Lauckhart et al. |
| 9,519,561 | B2 | 12/2016 | Lawbaugh |
| 10,044,654 | B2 | 8/2018 | Papa et al. |
| 10,091,312 | B1 | 10/2018 | Khanwalkar et al. |
| 10,148,792 | B1 | 12/2018 | Van Staden et al. |
| 10,210,541 | B2* | 2/2019 | Kanter .............. G06Q 30/0246 |
| 10,339,546 | B2 | 7/2019 | Dereszynski et al. |
| 10,460,353 | B2 | 10/2019 | Hsu et al. |
| 10,489,822 | B2 | 11/2019 | Wiener et al. |
| 10,521,818 | B2 | 12/2019 | Hui et al. |
| 10,572,903 | B2 | 2/2020 | Wiener et al. |
| 10,580,032 | B2 | 3/2020 | Wiener et al. |
| 10,755,300 | B2 | 8/2020 | Goodhart et al. |
| 2002/0086706 | A1* | 7/2002 | Chen ...................... H04L 67/34 |
| | | | 455/414.4 |
| 2002/0087403 | A1* | 7/2002 | Meyers ................ H04N 21/235 |
| | | | 705/14.69 |
| 2002/0098891 | A1 | 7/2002 | Graham et al. |
| 2002/0103698 | A1 | 8/2002 | Cantrell |
| 2002/0111865 | A1 | 8/2002 | Middleton, III et al. |
| 2002/0136183 | A1 | 9/2002 | Chen et al. |
| 2002/0165773 | A1 | 11/2002 | Natsuno et al. |
| 2003/0023690 | A1* | 1/2003 | Lohtia ................... H04L 51/224 |
| | | | 709/206 |
| 2003/0037108 | A1 | 2/2003 | Peiffer et al. |
| 2003/0158889 | A1 | 8/2003 | Massarani et al. |
| 2003/0188009 | A1 | 10/2003 | Agarwalla et al. |
| 2003/0200145 | A1 | 10/2003 | Krassner et al. |
| 2004/0036716 | A1 | 2/2004 | Jordahl |
| 2004/0073915 | A1* | 4/2004 | Dureau .................. H04H 60/91 |
| | | | 348/E7.071 |
| 2004/0179547 | A1 | 9/2004 | Kuffner et al. |
| 2005/0210533 | A1 | 9/2005 | Copeland et al. |
| 2005/0235030 | A1 | 10/2005 | Lauckhart et al. |
| 2005/0280507 | A1 | 12/2005 | Diorio et al. |
| 2006/0026063 | A1 | 2/2006 | Collins |
| 2006/0071759 | A1 | 4/2006 | Cooper et al. |
| 2006/0080681 | A1 | 4/2006 | Anwar et al. |
| 2006/0241923 | A1 | 10/2006 | Xu et al. |
| 2007/0050251 | A1 | 3/2007 | Jain et al. |
| 2007/0198344 | A1 | 8/2007 | Collison et al. |
| 2007/0255702 | A1 | 11/2007 | Orme |
| 2007/0256095 | A1 | 11/2007 | Collins |
| 2007/0266305 | A1 | 11/2007 | Cong et al. |
| 2007/0297590 | A1* | 12/2007 | Macbeth ................. G06Q 10/00 |
| | | | 379/201.02 |
| 2008/0004958 | A1 | 1/2008 | Ralph et al. |
| 2008/0082381 | A1 | 4/2008 | Muller et al. |
| 2008/0114709 | A1 | 5/2008 | Dixon et al. |
| 2008/0120165 | A1 | 5/2008 | Yan |
| 2008/0150784 | A1 | 6/2008 | Zhang et al. |
| 2008/0168103 | A1 | 7/2008 | Rakic |
| 2008/0266166 | A1 | 10/2008 | Schuchman |
| 2008/0320125 | A1 | 12/2008 | O'Sullivan et al. |
| 2009/0076899 | A1 | 3/2009 | Gbodimowo |
| 2009/0099920 | A1 | 4/2009 | Aharoni et al. |
| 2009/0150711 | A1 | 6/2009 | Kami et al. |
| 2009/0157813 | A1 | 6/2009 | Jung et al. |
| 2009/0171790 | A1 | 7/2009 | Nagarajayya |
| 2009/0187546 | A1 | 7/2009 | Hamilton Whyte |
| 2009/0216621 | A1 | 8/2009 | Anderson et al. |
| 2009/0265243 | A1 | 10/2009 | Karassner et al. |
| 2009/0271260 | A1 | 10/2009 | Sharma et al. |
| 2009/0300528 | A1 | 12/2009 | Stambaugh |
| 2009/0327449 | A1 | 12/2009 | Silverman et al. |
| 2010/0023868 | A1 | 1/2010 | Bonforte et al. |
| 2010/0042235 | A1* | 2/2010 | Basso ................. H04N 21/2389 |
| | | | 700/94 |
| 2010/0057843 | A1 | 3/2010 | Landsman et al. |
| 2010/0095317 | A1 | 4/2010 | Toebes et al. |
| 2010/0121676 | A1 | 5/2010 | Jackson |
| 2010/0146380 | A1 | 6/2010 | Rousso et al. |
| 2010/0146398 | A1 | 6/2010 | Evans et al. |
| 2010/0169792 | A1 | 7/2010 | Ascar et al. |
| 2010/0241597 | A1 | 9/2010 | Chen et al. |
| 2010/0251128 | A1 | 9/2010 | Cordasco |
| 2010/0278131 | A1 | 11/2010 | Jeong et al. |
| 2010/0287054 | A1 | 11/2010 | Zohar et al. |
| 2010/0295774 | A1 | 11/2010 | Hennessey |
| 2010/0310175 | A1 | 12/2010 | Holt |
| 2011/0029393 | A1 | 2/2011 | Apprendi et al. |
| 2011/0072131 | A1 | 3/2011 | Zohar et al. |
| 2011/0125587 | A1 | 5/2011 | Netzer et al. |
| 2011/0125593 | A1* | 5/2011 | Wright ................ G06Q 30/0641 |
| | | | 709/224 |
| 2011/0137737 | A1 | 6/2011 | Baird et al. |
| 2011/0153362 | A1 | 6/2011 | Valin et al. |
| 2011/0153435 | A1 | 6/2011 | Pisaris-Henderson |
| 2011/0163971 | A1 | 7/2011 | Wagner et al. |
| 2011/0239243 | A1 | 9/2011 | Dierks et al. |
| 2011/0246511 | A1 | 10/2011 | Smith et al. |
| 2011/0320286 | A1 | 12/2011 | Zohar et al. |
| 2012/0078273 | A1 | 3/2012 | Ramakrishnan et al. |
| 2012/0106793 | A1 | 5/2012 | Gershenson et al. |
| 2012/0215896 | A1 | 8/2012 | Johannsen |
| 2012/0226111 | A1 | 9/2012 | LeBoeuf et al. |
| 2012/0226700 | A1 | 9/2012 | Chang et al. |
| 2012/0290399 | A1 | 11/2012 | England et al. |
| 2012/0317472 | A1 | 12/2012 | Chernysh |
| 2012/0323694 | A1 | 12/2012 | Lita et al. |
| 2012/0324098 | A1 | 12/2012 | De Jager et al. |
| 2012/0324101 | A1 | 12/2012 | Pecjack et al. |
| 2013/0013500 | A1 | 1/2013 | Purves et al. |
| 2013/0031470 | A1 | 1/2013 | Daly, Jr. et al. |
| 2013/0065584 | A1 | 3/2013 | Lyon et al. |
| 2013/0110583 | A1 | 5/2013 | Ormont et al. |
| 2013/0124309 | A1 | 5/2013 | Traasdahl et al. |
| 2013/0124342 | A1 | 5/2013 | Virkar et al. |
| 2013/0154916 | A1 | 6/2013 | Ramaswamy et al. |
| 2013/0166377 | A1 | 6/2013 | Kirkby et al. |
| 2013/0179767 | A1 | 7/2013 | Bajric et al. |
| 2013/0275228 | A1 | 10/2013 | Milazzo |
| 2013/0281084 | A1 | 10/2013 | Batada et al. |
| 2013/0335576 | A1 | 12/2013 | Gotschlich et al. |

(56) References Cited

U.S. PATENT DOCUMENTS

| | | | |
|---|---|---|---|
| 2013/0339185 A1 | 12/2013 | Johnson | |
| 2014/0032610 A1 | 1/2014 | Kemmler et al. | |
| 2014/0040786 A1 | 2/2014 | Swanson et al. | |
| 2014/0129670 A1 | 5/2014 | Oliver | |
| 2014/0136312 A1 | 5/2014 | Saksena et al. | |
| 2014/0136346 A1 | 5/2014 | Teso | |
| 2014/0181634 A1 | 6/2014 | Compain et al. | |
| 2014/0189498 A1 | 7/2014 | Liverant et al. | |
| 2014/0189714 A1 | 7/2014 | Lawbaugh et al. | |
| 2014/0236710 A1* | 8/2014 | Nashed | G06Q 30/0246 705/14.45 |
| 2014/0281943 A1 | 9/2014 | Prilepov et al. | |
| 2014/0282642 A1 | 9/2014 | Needham et al. | |
| 2014/0324526 A1* | 10/2014 | Govindarajan | G06Q 30/0201 705/7.29 |
| 2014/0324545 A1 | 10/2014 | Splaine et al. | |
| 2014/0324575 A1 | 10/2014 | Haies et al. | |
| 2014/0330651 A1 | 11/2014 | Klemm et al. | |
| 2014/0336788 A1 | 11/2014 | Paunonen et al. | |
| 2014/0337104 A1 | 11/2014 | Splaine et al. | |
| 2014/0358688 A1 | 12/2014 | Tuttle et al. | |
| 2014/0372224 A1 | 12/2014 | Tawakol et al. | |
| 2014/0372225 A1 | 12/2014 | Tawakol et al. | |
| 2015/0026330 A1 | 1/2015 | Ahmed et al. | |
| 2015/0165937 A1 | 6/2015 | Harda et al. | |
| 2015/0178769 A1* | 6/2015 | Mirisola | H04L 63/0428 705/14.45 |
| 2015/0270930 A1 | 9/2015 | Luby et al. | |
| 2015/0334760 A1 | 11/2015 | Sartori et al. | |
| 2016/0027006 A1 | 1/2016 | Billett, Jr. | |
| 2016/0027055 A1 | 1/2016 | Dixon et al. | |
| 2016/0055527 A1 | 2/2016 | Wiener et al. | |
| 2016/0055540 A1 | 2/2016 | Chan et al. | |
| 2016/0055542 A1 | 2/2016 | Hui et al. | |
| 2016/0055546 A1 | 2/2016 | Chan et al. | |
| 2016/0125467 A1 | 5/2016 | Scott et al. | |
| 2016/0125471 A1 | 5/2016 | Hsu et al. | |
| 2016/0132938 A1 | 5/2016 | Wiener et al. | |
| 2016/0189237 A1 | 6/2016 | Marlin et al. | |
| 2017/0039242 A1 | 2/2017 | Milton et al. | |
| 2017/0094179 A1* | 3/2017 | Bellamy | H04N 5/76 |
| 2017/0180797 A1 | 6/2017 | Splaine et al. | |
| 2017/0186031 A1* | 6/2017 | Kirti | G06Q 30/0277 |
| 2017/0262885 A1 | 9/2017 | Fuentes et al. | |
| 2017/0278084 A1 | 9/2017 | Kumra et al. | |
| 2017/0316431 A1* | 11/2017 | Goodhart | G06Q 30/0242 |
| 2017/0316443 A1 | 11/2017 | Goodhart et al. | |
| 2017/0316446 A1 | 11/2017 | Goodhart et al. | |
| 2018/0018714 A1 | 1/2018 | Uhalley et al. | |
| 2018/0067937 A1 | 3/2018 | Bauman | |
| 2018/0109298 A1 | 4/2018 | Elsherif et al. | |
| 2018/0137534 A1 | 5/2018 | Goodhart et al. | |
| 2018/0315060 A1 | 11/2018 | Sheppard et al. | |
| 2020/0202102 A1 | 6/2020 | Chan et al. | |

OTHER PUBLICATIONS

Creative Adverts Database, WELOVEAD, Available online at http://web.archive.org/web/20110307041600/http://www.welovead.com/en/works/database, Mar. 7, 2011, 2 pages.

Is It Possible to Defend Against Browser Fingerprinting, Panopticlick, Jan. 11, 2013, 2 pages.

See your location on Maps, Google Maps Help, 2015, 3 pages.

The blue circle comes to your desktop, Google Maps, Jul. 9, 2009, 4 pages.

U.S. Appl. No. 13/436,044, Final Office Action dated Jun. 3, 2016, 11 pages.

U.S. Appl. No. 13/436,044, Final Office Action dated Sep. 21, 2017, 19 pages.

U.S. Appl. No. 13/436,044, Non-Final Office Action dated Jul. 19, 2013, 10 pages.

U.S. Appl. No. 13/436,044, Non-Final Office Action dated Aug. 14, 2015, 15 pages.

U.S. Appl. No. 13/436,044, Non-Final Office Action dated Dec. 29, 2016, 17 pages.

U.S. Appl. No. 13/436,044, Non-Final Office Action dated Jan. 25, 2019, 27 pages.

U.S. Appl. No. 13/436,082, Final Office Action dated Oct. 11, 2016, 16 pages.

U.S. Appl. No. 13/436,082, Non-Final Office Action dated Apr. 25, 2017, 16 pages.

U.S. Appl. No. 13/436,082, Non-Final Office Action dated Jun. 25, 2015, 53 pages.

U.S. Appl. No. 13/436,082, Restriction Requirement dated Apr. 1, 2013, 6 pages.

U.S. Appl. No. 13/802,288, Advisory Action dated Oct. 7, 2014, 4 pages.

U.S. Appl. No. 13/802,288, Final Office Action dated Dec. 23, 2016, 14 pages.

U.S. Appl. No. 13/802,288, Final Office Action dated Jun. 17, 2014, 37 pages.

U.S. Appl. No. 13/802,288, Final Office Action dated May 26, 2015, 55 pages.

U.S. Appl. No. 13/802,288, Non-Final Office Action dated Aug. 31, 2017, 12 pages.

U.S. Appl. No. 13/802,288, Non-Final Office Action dated Jan. 2, 2014, 16 pages.

U.S. Appl. No. 13/802,288, Non-Final Office Action dated Jun. 3, 2016, 19 pages.

U.S. Appl. No. 13/802,288, Non-Final Office Action dated Jan. 30, 2015, 51 pages.

U.S. Appl. No. 13/857,897, Advisory Action dated Jul. 2, 2014, 3 pages.

U.S. Appl. No. 13/857,897, Final Office Action dated Jun. 20, 2017, 19 pages.

U.S. Appl. No. 13/857,897, Final Office Action dated Mar. 14, 2014, 27 pages.

U.S. Appl. No. 13/857,897, Final Office Action dated Feb. 2, 2016, 33 pages.

U.S. Appl. No. 13/857,897, Non-Final Office Action dated Nov. 8, 2016, 37 pages.

U.S. Appl. No. 13/857,897, Non-Final Office Action dated May 1, 2015, 40 pages.

U.S. Appl. No. 13/857,897, Non-Final Office Action dated Jun. 28, 2013, 8 pages.

U.S. Appl. No. 14/270,337, Final Office Action dated Aug. 10, 2018, 11 pages.

U.S. Appl. No. 14/270,337, Non-Final Office Action dated Oct. 28, 2016, 16 pages.

U.S. Appl. No. 14/270,337, Non-Final Office Action dated Dec. 12, 2017, 17 pages.

U.S. Appl. No. 14/270,337, Notice of Allowance dated Apr. 10, 2019, 12 pages.

U.S. Appl. No. 14/734,473, Final Office Action dated Aug. 9, 2018, 15 pages.

U.S. Appl. No. 14/734,473, Non-Final Office Action dated Oct. 6, 2017, 10 pages.

U.S. Appl. No. 14/734,473, Notice of Allowance dated Jun. 12, 2019, 10 pages.

U.S. Appl. No. 14/791,074, Final Office Action dated Oct. 18, 2019, 16 pages.

U.S. Appl. No. 14/791,074, First Action Interview Office Action Summary dated May 30, 2019, 21 pages.

U.S. Appl. No. 14/791,074, First Action Interview Pilot Program Pre-Interview Communication dated Jan. 2, 2019, 7 pages.

U.S. Appl. No. 14/791,074, Notice of Allowance dated Aug. 21, 2020, 17 pages.

U.S. Appl. No. 14/791,105, Final Office Action dated Dec. 23, 2020, 14 pages.

U.S. Appl. No. 14/791,105, Final Office Action dated Sep. 23, 2019, 29 pages.

U.S. Appl. No. 14/791,105, First Action Interview Office Action Summary dated Apr. 30, 2019, 5 pages.

U.S. Appl. No. 14/791,105, First Action Interview Pilot Program Pre-Interview Communication dated Feb. 15, 2019, 4 pages.

(56) References Cited

OTHER PUBLICATIONS

U.S. Appl. No. 14/791,105, Non-Final Office Action dated Sep. 4, 2020, 33 pages.
U.S. Appl. No. 14/831,565, Final Office Action dated Mar. 4, 2019, 15 pages.
U.S. Appl. No. 14/831,565, First Action Interview Office Action Summary dated Jul. 12, 2018, 6 pages.
U.S. Appl. No. 14/831,565, First Action Interview Pilot Program Pre-Interview Communication dated May 31, 2018, 4 pages.
U.S. Appl. No. 14/831,565, Notice of Allowance dated Jul. 22, 2019, 11 pages.
U.S. Appl. No. 14/831,595, Final Office Action dated Mar. 6, 2019, 15 pages.
U.S. Appl. No. 14/831,595, First Action Interview Office Action Summary dated Jul. 12, 2018, 6 pages.
U.S. Appl. No. 14/831,595, First Action Interview Pilot Program Pre-Interview Communication dated Jun. 12, 2018, 4 pages.
U.S. Appl. No. 14/831,595, Notice of Allowance dated Aug. 16, 2019, 12 pages.
U.S. Appl. No. 14/995,755, Final Office Action dated Jul. 9, 2019, 7 pages.
U.S. Appl. No. 14/995,755, Non-Final Office Action dated Jan. 10, 2019, 8 pages.
U.S. Appl. No. 14/995,755, Notice of Allowance dated Oct. 16, 2019, 11 pages.
U.S. Appl. No. 15/824,833, Notice of Allowance dated Apr. 8, 2020, 10 pages.
Butun et al., A Survey of Intrusion Detection Systems in Wireless Sensor Networks, IEEE Communications Surveys & Tutorials, vol. 16, No. 1, 2014, pp. 266-282.
Eckersley, Browser Versions Carry 10.5 Bits of Identifying Information on Average, Electronic Frontier Foundation, Jan. 27, 2010, 4 pages.
Eckersley, How Unique Is Your Web Browser, Electronic Frontier Foundation, Jul. 21, 2010, 19 pages.
Nakamoto, Bitcoin: A Peer-to-Peer Electronic Cash System, Available online at https://web.archive.orgjweb/20100704213649/http://www.bitcoin.org:80/bitcoin.pdf, Oct. 31, 2008, pp. 1-9.
International Application No. PCT/US2015/058165, International Search Report and Written Opinion dated Jan. 14, 2016, 9 pages.
Schwartz et al., Clicktale Heatmaps, Available Online at: https://www.clicktale.com/resources/blog/clicktale-heatmaps/, Apr. 3, 2007, 5 pages.
Sinitsyn, A Synchronization Framework for Personal Mobile Servers, Proceedings of the Second IEEE Annual Conference on Pervasive Computing and Communications Workshop, Mar. 14-17, 2004, pp. 1-5.

* cited by examiner

SCRIPT-BASED TECHNIQUES FOR COORDINATING CONTENT SELECTION ACROSS DEVICES

CROSS REFERENCE TO RELATED APPLICATIONS

This application claims the benefit of priority to U.S. Provisional Application No. 62/900,484, filed Sep. 14, 2019, entitled "SCRIPT-BASED TECHNIQUES FOR COORDINATING CONTENT SELECTION ACROSS DEVICES" which is hereby incorporated by reference in its entirety for all purposes.

This application is related to each of: U.S. application Ser. No. 14/791,105, filed on Jul. 2, 2015; U.S. application Ser. No. 14/831,565, filed on Aug. 20, 2015; U.S. application Ser. No. 15/824,833, filed on Nov. 28, 2017; U.S. application Ser. No. 14/831,565, filed on Aug. 20, 2015; U.S. application Ser. No. 14/831,595, filed on Aug. 20, 2015; U.S. application Ser. No. 14/995,755, filed on Jan. 14, 2016; and U.S. application Ser. No. 14/270,337, filed on May 5, 2014. Each of these applications is hereby incorporated by reference in its entirety for all purposes.

BACKGROUND

Residential, public, and professional networks operate many disparate types of processing devices. For instance, a professional network distributes communications to desktop computing devices, media devices (e.g., televisions or other content display devices), mobile device, automation devices, etc. Each device may be associated with a different device identifier that can be used to, among other things, distribute content to the device. Yet, a portion of the devices within a network may be operated by a same user. Since a set of devices operated by a same user corresponds to different device identifiers, it may not be possible to distribute specific content to a particular device of the set of devices operated by a same user.

BRIEF SUMMARY

A method is disclosed for coordinating content selection across devices. The method includes transmitting, from a user device and to a web server, a request for webpage content of a webpage; receiving, from the web server and at the user device, one or more response communications that includes the webpage content, embedded content, and a script; retrieving, from a locally stored data object of the user device, a device identifier initially generated by a remote system; detecting, using the script, whether at least part of the embedded content is being presented within a portion of the webpage that is displayed on a screen of the user device; and transmitting a report communication to a remote ID-graph system, the report communication including the device identifier and an indication as to whether the at least part of the embedded content has been presented within the portion of the webpage that was displayed on the screen of the user device.

Another aspect of the present disclosure includes an electronic device comprising one or more processors and a non-transitory computer-readable media that includes instructions that when executed by the one or more processors, cause the one or more processors to perform methods described above.

Other aspects of the present disclosure include a non-transitory computer-readable media that includes instructions that when executed by one or more processors, cause the one or more processors to perform the methods described above.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are disclosed for using viewing-detection technology and identity graphs to generate metrics indicating, for a given piece of secondary content, a quantity of users for which the secondary content was viewable on a webpage. The viewing-detection technology can use a script or tag to dynamically detect how much of the secondary content is in view (e.g., displayed on screen) at a user device, for how long the secondary content is in view and any user interactions with the secondary content. The same script or tag can be configured to retrieve information associated with a locally stored data object that includes a unique identifier of the user device and additional information (e.g., webpage viewing information), such as an identifier of a cookie and/or cookie data (e.g., that includes a device identifier and/or profile identifier). The script or tag can cause the user device to transmit a communication to an ID-graph controller (that may include multiple sub-systems that are independently controlled and physically separated) that includes the identifier(s), viewing information and other data (e.g., time stamp, a webpage URL and/or IP address). The ID-graph controller can maintain device-specific profiles and user-specific profiles based on data sent via execution of the script. One-to-one, one-to-many, many-to-one or many-to-many connections between devices and user representations can be generated and/or modified based on data comparisons. Further, profiles of multi-user entities can be defined (e.g., representative of a household) based on overlap of user-specific profile data.

Detecting unique users and multi-user entities and tracking in-view metrics can facilitate accurately tracking a size of a population to which a piece of secondary content was viewable. This technique can reduce an extent to which the population is inflated as a result of secondary content having been identified for inclusion in a webpage but failing to be viewed as a result of (for example) a user leaving a webpage before the secondary content was loaded or in an on-screen view. Further, this technique can reduce an extent to which the population is over-estimated as a result of estimating that each device corresponds to a different user.

Further, use of user-level and multi-user profiles can facilitate coordinated content presentation across devices. Multiple devices that correspond to a single user can be identified, and content presentations on one of the multiple devices can influence (concurrent or time separated) secondary content selected for presentation on another of the multiple devices. For example, upon detecting that a first device associated with a user is on a particular channel that will present Content A within a particular time period, a secondary-content selection performed for a second device associated with the user can be biased towards related content. This selection may be made after secondary content was selected for presentation in a webpage or after the webpage was rendered, in that a subsequent selection may be made if (for example) the initially selected secondary content had not yet been in view. That is, initially selected secondary content may be updated so as to be replaced by other secondary content in particular circumstances (e.g., if the initially selected secondary content has not yet been in view or is not currently in view). The other secondary content can be identified based on recent data, which can include content presented and/or in view at one or more other devices associated with the user via an ID graph. For example, the other content may be selected to exclude content presented on the one or more other devices. As another example, the other secondary content may have similarities with and/or be complementary to content presented on the one or more other devices.

Figure 1:
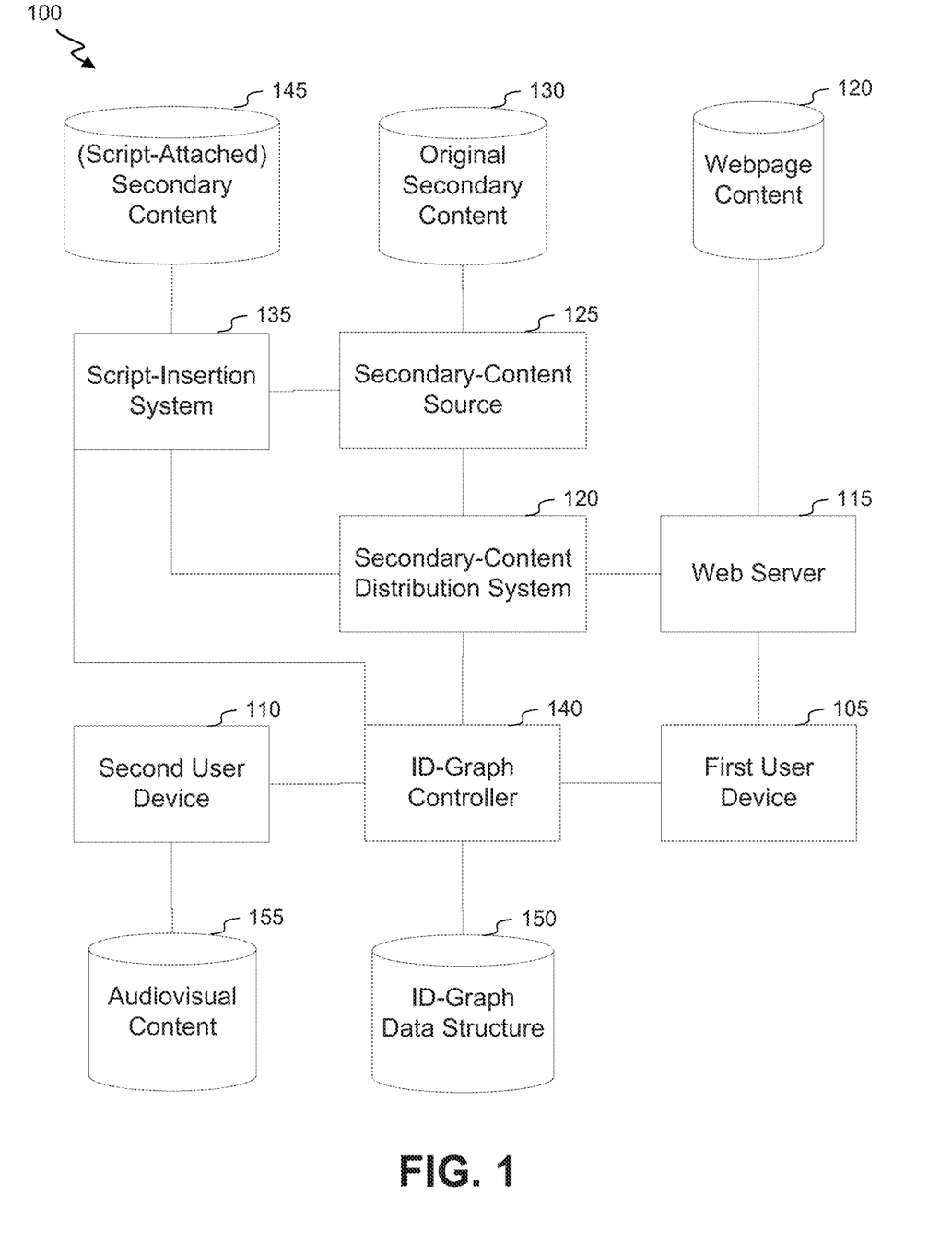
FIG. 1 depicts an exemplary interaction system for using viewing-detection technology and identity graphs to generate content-viewing metrics and to inform content selections according to at least one aspect of the present disclosure.

FIG. 1 shows an exemplary interaction system 100 for using viewing-detection technology and identity graphs to generate content-viewing metrics and to inform content selections. Interaction system 100 includes a first user device 105 and a second user device 110, each of which includes an electronic device configured to receive and present information. First user device 105 can include a device (e.g., a computer, laptop, tablet or smart phone) configured to retrieve and present webpage data. Specifically, first user device 105 can generate and transmit a request for webpage data to a web server 115. Web server 115 can manage webpage content 120 that is to be included in the webpage. The webpage can further include one or more portions of secondary content. For example, the webpage can be configured to have one or more frames in which an advertisement (e.g., including image or video content) can be presented. Web server 115 can send a request to a secondary-content distribution system 120, which can select the particular secondary content to return to web server 115.

Secondary-content distribution system 120 can manage secondary content from multiple secondary-content sources 125, each of which may have transmitted or otherwise availed original secondary content 130 to secondary-content distribution system 120. Each secondary-content source 125 may additionally have identified one or more viewing targets to secondary-content distribution system 120, such as a target quantity of impressions (e.g., within a predefined time period) and/or a target quantity of unique users to which the secondary content is to be presented (e.g., within a predefined time period).

A script-insertion system 135 can attach a script to original secondary content 130 received from secondary-content source 125. For example, a pixel or tag can be generated that includes a script (e.g., JavaScript code) that, when executed at a user device (e.g., first device 105), can trigger local retrieval at the user device of a part or all of a locally stored data object that includes a unique identifier of a user device and data corresponding to the user device (e.g., webpage-viewing, webpage-request and/or webpage-interaction data). For example, the retrieval can include retrieval of part (e.g., an identifier of and/or part of the contents of) or all of a data object, such as a cookie (e.g., having particular identifying characteristics). The retrieval can additionally or alternatively include one or more webpage-viewability signals (e.g., indicating what webpage content has been viewed) from a data object. The data object (e.g., cookie) can store identifying information, such as a device identifier and/or profile identifier. The device identifier may include (for example) an absolute device identifier (e.g., a MAC address) or a device identifier that generally lacks meaning across systems (e.g., an identifier generated using a pseudo-random technique at remote system). In some instances, the device identifier is generated using a technique disclosed in U.S. application Ser. No. 14/791,105, which is hereby incorporated by reference in its entirety for all purposes. The profile identifier may include an identifier generated at a remote system and may correspond to an identity of (for example) an individual person or household. The data object (e.g., cookie) may further include device characteristics, such as a type of device and/or operating system. The data object may have been generated by another system.

A resulting script-attached secondary content 145 (referred to herein as "secondary content") can be used as embedded content to be included in a portion of the requested webpage. For example, web server 115 can configure a webpage data such that secondary content 140 can be presented within a frame of the requested webpage.

Execution of the script can further trigger collection of information about (for example) a state of loading of a webpage (e.g., whether the secondary content has been rendered), what is being presented on the webpage and/or contextual data. For example, the script may detect a quantity or portion of pixels of a secondary-content image or video that are in view and may further determine whether a browser window is in-focus (e.g., such that the browser is not minimized and the webpage is not in a background tab). The quantity or portion can be estimated by determining (for example) where a given script-associated pixel of the secondary-content image is located relative to an in-screen viewing area. This location, along with a size and/or shape of the secondary content, can be used to estimate which pixels are in view at a given time. Viewing statistics can then be calculated (e.g., a duration during which at least a threshold quantity or portion of pixels of the secondary content is in view or a binary indicator as to whether at least a threshold quantity or portion of the pixels were in view for at least a threshold duration).

In some instances, the data object is updated (e.g., as a result of execution of the script) to include viewing information (e.g., including viewing statistics). Such an update may be selectively performed when a condition is satisfied. For example, a condition may be configured to be satisfied upon determining that a threshold part (e.g., pixel quantity, area or portion) of secondary content has been in view (e.g., at all or for at least a threshold duration). The update may include one or more viewing statistics, an indication that a particular condition was satisfied, data about the secondary content and/or contextual data. Data about the secondary content can include (for example) an identifier of the secondary content, an identifier of an advertising campaign associated with the secondary content and/or a source of the secondary content. The contextual data can include (for example) a time at which the webpage was loaded and/or rendered, a time at which the secondary content was loaded and/or rendered, a URL of the webpage, an identifier of a secondary-content distribution system, an identifier of a user agent, positional information about the secondary content (e.g., indicating where the secondary content is positioned within the webpage, an IP address used during the webpage viewing, network data detected during a session in which the webpage was viewed (e.g., indicating a number of devices detected as being on a given network, a number of devices detected using Bluetooth or another wireless network, a wireless strength, etc.).

Execution of the script can trigger generation and transmission of one or more communications with the information to ID-graph controller 140. The communication(s) can include viewing information, data about the secondary content and/or contextual data. The communication(s) can further include data retrieved from the data object (e.g., a device identifier and/or profile identifier).

ID-graph controller 140 can control, manage and update an identity-graph data store 150, which can include identifiers and characterizing data of various users, identifiers and characterizing data of various devices, and connections (e.g., which may be indicated via stored identifier associations) between user identifiers and device identifiers. A device identifier may include (for example) a unique identifier of the device generated by received from a remote source or a sub-system of ID-graph controller 140 (e.g., a MAC address, IMEI number or ESN number). A user identifier may include (for example) a unique identifier of the user generated by a remote system or ID-graph controller 140 or received from another source (e.g., an email address or account login name). Various types of connections may exist. A connection between a device and a user may represent an inference that the user owns and/or uses the device. A connection type or metadata may indicate whether it is inferred that a device is used by a single given user or whether it is inferred that the given user is one of multiple users that use the device.

Identity-graph data store 150 can include characteristics of each of one or more users and/or devices, such as a frequent (e.g., most common) location (e.g., such as physical address or the like), an IP address, common device use hours, common types of content requested or viewed (e.g., including frequently visited websites, frequently used applications, keywords of frequented content, etc.), identifications of viewed or requested content (e.g., including content identifiers, a number of time content was requested or seen, a per-view or cumulative duration of viewing, etc.), account identifiers, etc.

These characteristics can be used (for example) to determine whether to generate a new connection between a device representation and entity representation, whether to merge (or split) user representations, whether to merge (or split) device representations and/or how to define (or modify a definition of) individual profiles. Further, these characteristics can be used to determine whether two or more users are associated with a same multi-user entity (e.g., a household, business, organization or residency).

ID-graph controller 140 can generate and manage a profile for each entity, which can include an individual user or multi-user entity. The profile can identify (for example) inferred characteristics of the entity (e.g., of one or more users), one or more devices to which the entity is associated, one or more users to which the entity is associated in the instance of a multi-user entity, and/or historical content-viewing data. In some instances, the profile includes one or more pointers, each to a representation of a connected device and/or user.

In some instances, secondary-content distribution system 120 accesses data generated by and/or transmits queries to ID-graph controller 140 before identifying secondary content to return to web server 115. A data-access retrieval and/or a query may identify (for example) a user device. ID-graph controller 140 (or a sub-system thereof, which may be independently controlled) can use the data to query ID-graph data structure 150 and determine whether any device representation and/or user representation corresponds to the data. If so, other information from the device representation and/or user representation can be returned to secondary-content distribution system 120, which may be used to select secondary content. The other information can (for example) include static information (e.g., device type, inferred user age) and/or dynamic information (e.g., recent location, categories of content for which frequent user interaction was recently detected).

As one example, first user device 105 can include a laptop that accesses pages from the Internet, and second user device 110 can include a small television that retrieves and presents audiovisual content 155 from one or more audiovisual-content sources (e.g., a cable provider, online streaming provider, etc.). ID-graph controller 140 can detect that a set of characteristics associated with first user device 105 and second user device 110 match, and that the characteristics are of a type sufficiently unique to indicate that first user device 105 and second user device 110 are likely used by a same user. Second user device 110 can report what particular content is being presented at what time to ID-graph controller 140, which can update ID-graph data structure to indicate that the particular content was presented at second user device 110 and to the user. First user device 105 may be used to access the a website around the same time as the audiovisual-content presentation on second user device 110. Secondary-content distribution system can query ID-graph controller with an identifier of first user device 105. ID-graph controller 140 can detect that the user is connected to first user device 105, detect the recent presentation of the particular content, and return a query result that identifies the particular content. Secondary-content distribution system 120 may then select secondary content in view of the recent particular-content presentation (e.g., to relate to a similar, same or complementary subject). For example, secondary-content distribution system 120 can bias selection of secondary content to be embedded in webpages to be viewed at first user device 105 based on the content reported by second user device 110.

It will be appreciated that each of web server 115, secondary-content distribution system 120, secondary-content source 125, script-injection system 135 and ID-graph controller 140 can include and/or can be a component within (e.g., via existence of corresponding code and access to one or more processors and storage space) one or more computers and/or one or more servers. In some instances, a single computing system (e.g., that includes one or more computers and/or one or more servers) can include two or more depicted components in FIG. 1. For example, a single computing system can include secondary-content distribution system 120 and script-insertion system 135, or a single computing system can include secondary-content source 125 and script-insertion system. However, other components depicted in FIG. 1 may correspond to distinct computing systems. For example, each of two or more of web server 115, secondary-content distribution system 120, secondary-content source 125 and ID graph controller 140 can include and/or be a component within a computing system that is separate from each other of the two or more of web server 115, secondary-content distribution system 120, secondary-content source 125 and ID graph controller 140. The separation can include (for example) physical separation, distinct IP addresses and/or separate processors. Further, each of two or more of web server 115, secondary-content distribution system 120, secondary-content source 125 and ID graph controller 140 may be controlled by an entity that is different than is different than an entity controlling each other of the two or more of web server 115, secondary-content distribution system 120, secondary-content source 125 and ID graph controller 140.

Figure 2:
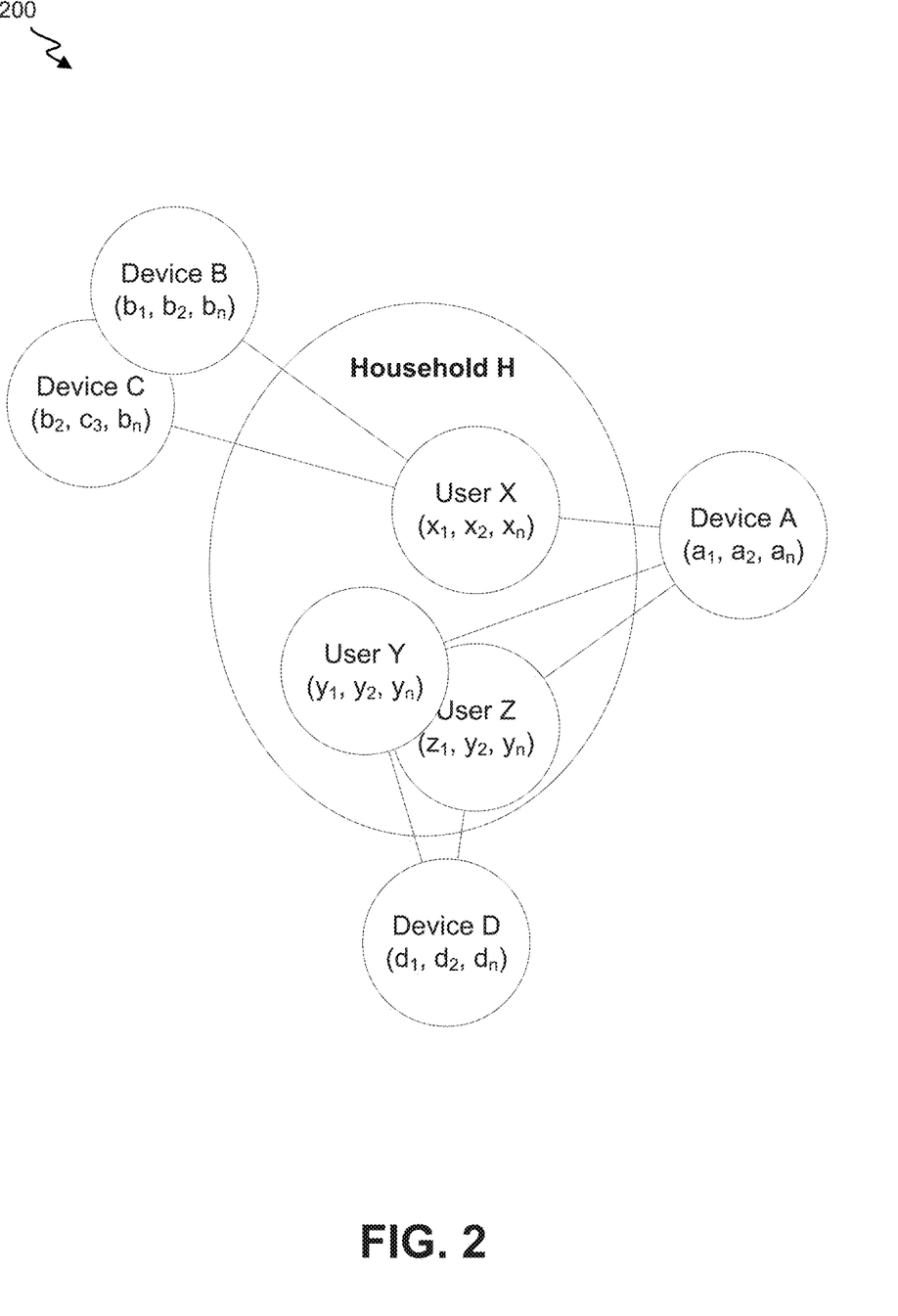
FIG. 2 illustrates an exemplary representation of an ID graph that may be generated, updated, accessed and/or controlled by an ID-graph controller according to at least one aspect of the present disclosure.

FIG. 2 illustrates an exemplary representation of an ID graph 200 that may be generated, updated, accessed and/or controlled by an ID-graph controller, such as ID-graph controller 140 from FIG. 1. In this example, ID graph 200 includes a representation of four devices: Devices A-E. These device names can represent unique device identifiers generated by the ID-graph controller. ID graph 200 stores a set of data points about each device. The data points can include static data (e.g., device type), dynamic data (e.g., location), and/or session-specific data (e.g., date and/or time, accessed URL, duration of a given session, browser being used). In this instance, multiple characteristics of Device B are the same as corresponding characteristics of Device C.

ID graph 200 can further include a representation of three users: User X, User Y and User Z. These user names can represent unique user identifiers generated by the ID-graph controller. ID graph 200 also stores a set of data points about each user. The data points can include (for example) inferred characteristics (e.g., age bracket as inferred based on URLs that were visited) and/or information identified or inferred based on particular device usage. For example, if it is inferred that User X is using Device B during a particular session, it may be determined that account information and webpage-access data associated with that session (e.g., which sites were requested, what content was presented on a screen of Device B and/or what types of interactions were detected) can be used to identify or modify characteristics of User X. In this instance, multiple characteristics of User Y are the same as corresponding characteristics of User Z. Techniques used to assess whether to link and/or merge profiles can include probabilistic-link techniques disclosed in U.S. application Ser. No. 14/831,565, filed on Aug. 20, 2015, which is hereby incorporated for reference in its entirety for all purposes.

For example, the ID-graph controller may use device information (e.g., IP address, media access control address, device identifier, profile identifier, or the like), communications received by or transmitted from a device, backend registrations (e.g., a registration between a user or user device and a service provider), browsing history, or the like to link devices and/or users. For example, a device may be associated with a service provider that stores registration information associated with the device and its user. For instance, a television may include a cable service and the service provider (e.g., cable company) may store an association between the television and the user. The registration information can include, but is not limited to, a mapping between a user and a device, a physical (e.g., mailing) address, a physical address of the device (e.g., such as a media access control address or the like), billing information, or the like. A second device may be associated with the same mailing address through a registration with another service provider (e.g., such as an e-commerce webpage that stores billing or shipping information). The ID-graph system may then determine that the television and the second device are linked based on the matching mailing addresses. Devices may be associated with a plurality of service providers (e.g. each including registration information), such as email services, e-commerce websites, cable services, streaming services, or the like. The registration information may be used alone or with other device identifiers (e.g., such as IP addresses, etc.) to link devices with other devices, devices with particular users, users with other users, etc.

Connections in ID graph 200 can indicate which users use which devices. Thus, in this instance, it is inferred that only User X uses Devices B and C, both Users Y and Z user Device D, and Users X, Y and Z user Device A.

As new communications are received, the ID-graph controller can determine whether to update ID graph 200 to (for example) include new device and/or new users and/or whether to change or add one or more device characteristics user characteristics. For example, the ID-graph controller may receive a data packet that lacks a unique device identifier but that includes an IP address and location that corresponds to Device B. The ID-graph controller may determine whether the data-packet information is itself sufficiently unique or of data types that are sufficiently unique to indicate that the device associated with the data packet is the same as Device B. The data packet may further include session data that includes a domain name corresponding to one frequently visited by User X. The ID-graph controller may determine whether the data-packet information is itself sufficiently unique or of data types that are sufficiently unique to indicate that a user associated with the data packet is the same as User X.

To make these determinations, the ID-graph controller may query ID graph 200 to determine how many other devices are associated with the same IP address and/or the same location. It may be less likely that the device associated with the data packet is the same as Device B if (for example) a high number of other devices are associated with the same IP address and/or location (e.g., as the IP address and/or location may then correspond to a public or professional location used by many people) and/or if other device(s) that are associated with the same IP address and/or location are associated with a high number of users. Additionally or alternatively, the ID-graph controller may look-up a data type in a data structure to retrieve a score indicating a likelihood that a given type of data corresponds to another device and/or a user connected to the other device, when the other device shares a same value for the data type. The data-type scores and/or results of the queries of ID graph 200 can be used to identify a weight associated with each data type in the data packet. The weights may be combined (e.g., multiplied) to generate an output, which can be compared with a threshold to determine whether the device associated with the data packet is to be inferred to be the same as Device B.

A similar assessment may be performed to determine whether to infer that the data packet is associated with a user in ID graph 200. However, in addition to or instead of performing this type of analysis, existing connections can be used. For example, it may be determined that domain names are not a variable type that is sufficiently unique to infer that a user associated with the data packet is the same as another user in ID graph 200. Nonetheless, only one user (User X) is connected to Device B in ID graph 200. Depending on a confidence of this connection (and/or on whether a characteristic stored in association with User X indicates a propensity for accessing the domain name), it may be inferred that the data packet corresponds with User X.

A similar type of analysis may be performed to determine whether to merge representations. For example, consider receiving new data associated with Device C that can be used to determine that Device C has characteristic bn. At this point, Devices B and C would share two characteristics, are both connected with X, and each have one characteristic simply not represented in the representation of the other device. A uniqueness of the characteristics and of user connections may be assessed to determine whether to infer that Devices B and C correspond to a same device (which can trigger merging representations of the devices).

Further, a similar type of analysis may be performed to determine whether to split a device or user representation or delete a connection as a result of a lack of correspondence between new data and data stored in the identity-graph structure. For example, suppose that a first communication indicates that Device D is at Location M and a second communication received 30 seconds later indicates that Device D is at a far-away Location N. A reliability of the data and a uniqueness analysis of existing data received in individual communications pertaining to Device D may be used to determine whether to split the representation of Device D into representations of two devices.

ID graph 200 can be used to generate or define entity profiles. An entity may include (for example) a user, household, residency, company or organization. Thus, an entity profile can be connected to one or more particular user representations. One or more rules and/or models (e.g., machine-learning models) may be used to infer that a set of users correspond to a single household, residency, company or organization. For example, each of one or more data types may be associated with one or more weights (e.g., learned weights or weights identified via input) that indicate an extent to which similar or same values for the data type across users is indicative of the users being in a same household, residency, company or organization. The rule(s) and/or model(s) may further be based upon a portion or number of times that same or similar values for a given type have been detected and/or any temporal dependency on an extent to which same or similar values for the data type have been detected. Similarly, the rule(s) and/or model(s) can be configured to indicate an extent to which different values for a given type is indicative of multiple users being associated with a different household, residency, company or organization. Various data-type values can be considered in this manner to determine whether to associate multiple users with a same household, residency, company or organization.

ID graph 200 can be dynamically updated based on device communications identifying recent content viewing and device information (e.g., location). These updates can be used to inform new content selections. For example, suppose that a communication is received that indicates that Device A is showing a tennis match and that two other devices are detected as being on a same WiFi network. The representation for Device A may indicate that it is a smart television located at a particular location. The ID-graph controller may receive a request from a secondary-content distribution system that identifies Device B as being in use at the particular location and may request relevant data. The ID-graph controller may detect the connection between Device B and User X and the connection between User X and Device A, such that the query result can be generated to reflect the very recent (and likely concurrent) presentation of the tennis match. The secondary-content distribution system can then select secondary content based on an inference that a tennis match is on in a same household as User X.

Figure 3:
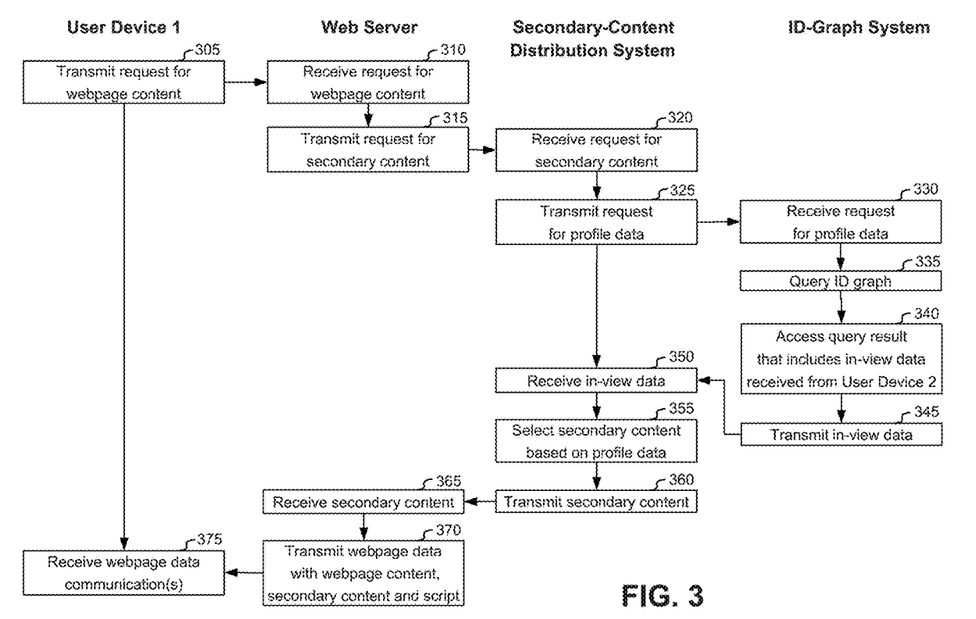
FIG. 3 illustrates an exemplary flow diagram for processing webpage requests according to at least one aspect of the disclosure.

FIG. 3 shows a flow diagram for processing webpage requests. At block 305, a user device transmits a request for webpage content. The request can include a URL. The request can include other data, such as http header data, an IP address and/or a user-agent string. The request is received at a web server at block 310. The web server can retrieve webpage content for the webpage. The webpage may be configured to further present secondary content. Thus, at block 315, the web server transmits a request for secondary content to a secondary-content distribution system, which receives the request at block 320. The request for secondary content can include some or all of the other data from the webpage request.

At block 325, a request for profile data is transmitted from the secondary-content distribution system to an ID-graph system, which receives the request at block 325. The request for profile data can include some or all of the other data from the webpage request. The ID-graph system can include and/or can be the same as ID-graph controller 140 from FIG. 1.

At block 335, the ID-graph system queries an ID graph for profile data. The query can include (for example) some or all of the other data from the webpage request or a processed version thereof. For example, the ID-graph system may use a predefined technique (e.g., including a hashing technique) for transforming values of particular variable types into a device identifier. In some instances, an initial query result identifies a device representation or user representation associated with the webpage request. In some instances, the device representation and/or user representation is associated with a profile representation and/or is connected to a representation of a second user device. Thus, it may be inferred that the second user device (for example) corresponds to a same user or same household as does the first user device.

In the depicted instance, a result of the query includes information as to what content has been in-view on a screen of the second user device. The result is accessed at 340. The in-view data (or the entire result) is transmitted to the secondary-content distribution system at block 345, which receives the in-view data at block 350. Alternatively or additionally, other profile data that is associated with the second user device can be accessed and transmitted (e.g., location data, a time of last detected use and/or content-interaction data).

At block 355, the secondary-content distribution system selects particular secondary content based on the profile data. The selection may include (for example) searching a secondary-content data store for secondary content associated with one or more same or similar tags as those associated with other content that was viewed at the second user device. The secondary content may include (for example) an advertisement (e.g., text, an image and/or a video).

At block 360, the secondary content is transmitted to the web server, which receives the secondary content at block 365. At block 370, the web server transmits webpage data that includes the webpage content, secondary content and a script to the first user device. At block 375, the first user device receives the webpage data. In some instances, the webpage content and script may have been previously transmitted, which may (for example) speed rendering of the webpage and/or speed execution of the script. In such instances, execution of the script may result in collection of additional data corresponding to the first user device, which may be used to query the ID graph at block 335 and/or select secondary content at block 355, Thus, the webpage data may be transmitted via a single communication or multiple communications.

Figure 4:
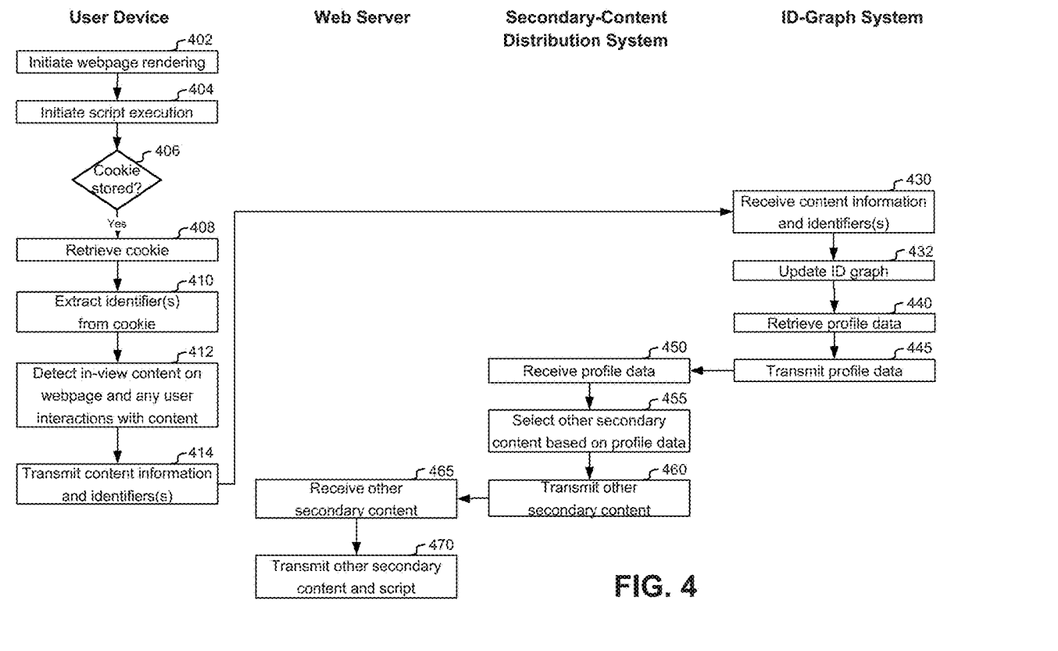
FIG. 4 shows a flow diagram for using in-view content detection and ID graphs for content selection according to at least one aspect of the disclosure.

FIG. 4 shows a flow diagram for using in-view content detection and ID graphs for content selection. In some instances, the process of FIG. 4 can follow partial or full performance of the process of FIG. 3. At block 402, webpage rendering is initiated. At block 404, a script (e.g., included in webpage data for a webpage being rendered) is initiated. The script may be associated with the webpage being rendered. For example, the script may be embedded within secondary content for the webpage (e.g., using a technique as disclosed in U.S. application Ser. No. 15/824, 833, filed on Nov. 28, 2017, which is hereby incorporated by reference in its entirety for all purposes).

Execution of the script can trigger one or more of blocks 406-414. At block 406, it is determined whether a particular data object (e.g., cookie) associated with and/or identified via the script is stored locally at the user device.

The data object can include one or more identifiers, information about the user device (e.g., device type, operating system), webpage-access history (and/or statistics) and/or secondary-content-presentation history (and/or statistics). At block 410, one or more identifiers are extracted from the data object. The one or more identifiers can include an identifier of the data object. The identifier(s) can include a device identifier and/or profile identifier.

At block 412, content-viewing data is collected by detecting what content is presented at a non-minimized window of the webpage. The collection may be performed using (for example) a script-attached pixel, which can send an http request to a particular destination upon loading. Content-interaction data can further be collected, which can indicate whether (for example) a user moused over or clicked on a particular piece of content.

At block 414, content information (e.g., including the content-viewing data and/or content-interaction data) and the object-extracted identifier(s) are transmitted to the ID-graph system, which receives the content information at block 430. At block 432, the ID-graph system updates the ID graph based on the content information. For example, block 432 can include identifying one or more representations (e.g., of a device, user or profile) that correspond to the identifier(s) and to update the representation(s) to indicate which particular content was in view (e.g., by adding an identifier of or associated with the viewed content).

At block 440, the ID-graph system retrieves profile data that corresponds to a profile that was updated at block 432. The profile data may include the newly added content information and/or other profile data. In some instances, block 440 is performed in response to subsequently receiving a request (e.g., associated with the user device or other user device) for profile information from a secondary-content distribution system. At block 445, the profile data is transmitted to the secondary-content distribution, which receives the profile data at block 450.

At block 455, other secondary content is selected based on the profile data. For example, the other secondary content may relate to webpage content that was reported to have been in view at the user device. As another example, the other secondary content may correspond to a marketing campaign that is different than a marketing campaign associated with secondary content that had been in view at the user device.

At block 460, the secondary-content distribution system transmits the other secondary content to the web server, which receives the other secondary content at block 465. At block 470, the web server transmits the other secondary content and, optionally, a script 470. The transmission may be to the user device or to another user device associated with a same profile. In some instances, the other secondary content is transmitted to the user device to be presented in an iframe that has yet to be in view.

Thus, techniques disclosed herein can facilitate selecting content for a given entity based on recent information pertaining to content viewing pertaining to a same entity. The content-selection technique uses technology that determines whether particular content portions have actually be in view on a screen and ID graphs that can aggregate content-viewing instances across devices. This aggregation can facilitate strategic content selection and can further be used to report statistics to secondary-content sources and to obtain target numbers of content impressions on a per-user and/or per-entity basis, as opposed to a per-device basis.

It will be appreciated that alternative embodiments are contemplated. For example, instead of or in addition to selecting secondary content based on the update of the ID graph generated at block 432, the update may be used to generate impression metrics. For example, each of one or more content objects (e.g., secondary content objects) can be associated with one or more identifiers (e.g., associated with the object itself and/or a higher level identifier, such as an advertising-campaign identifier). The ID graph can then be queried to determine how many users, entities, households, etc. viewed a given content object and/or a content object associated with a higher level identifier can then be quantified. Thus, statistics regarding presentations of content objects that are in view can be availed to sources of the content objects.

In some instances, a local ID-graph system may be positioned with a same local network as devices that are associated with a same profile (e.g., such as with a residence, a business, or the like). For example, the ID-graph system may positioned within a device connected to a gateway of a local area network in which other devices of a same profile are also connected. When the ID-graph system operates within a local area network, content-viewability information can be shared between devices directly and privately within the local network. For example, a script executing within a webpage may execute a query access in-view data of another device. In some instances, the query may be executed locally (e.g., a local data store of the first device that operates an instance of an ID-graph system) or transmitted to one or more devices of the local area network. The script receives the in-view data corresponding to content displayed on a screen of at least one of the one or more devices of the local area network. The script then presents secondary content associated with the content by presenting locally stored secondary content or transmitting a request to the webserver or to the secondary-content distribution system for secondary content.

Devices of the local area network may be authenticated and/or provisioned before sharing the in-view data. For instance, a first device may be configured to share in-view data by operating a local instance of an ID-graph system. A second device may be configured to share in-view status and/or profile information by either connecting directly to the first device (e.g., via Wi-Fi hotspot of the first device, a cable, or the like) or to the local area network. The first device may first authenticate the second device before passing in-view data to the second device to prevent user data from be transmitted to an unauthorized device such as a device that is not associated with a same user or entity. For example, the second device may be determined to be authenticated by accessing the local area network (e.g., by having the access credentials of the local area network, the second device may be considered associated with a same user as the first device or otherwise an authorized device). In another example, the second device may be authenticated by transmitting access credentials (e.g., a username/password), by receiving user input of an alphanumeric string on the first device that was displayed on the second device (e.g., ensuring both devices are associated with and controlled by a same user), comparing a token stored on the second device by a manufacturer of the second device to a local/remote data store of tokens, detecting a profile stored on the second device that matches a profile on the first device, or the like.

Once authenticated, the first device and the second device may begin sharing in-view and profile information directly through the local area network. In some instances, new devices that are added to the network may be provisioned by the first device to enable information access between devices of the local area network. In some instances, provisioning a new device may include transmitting a script to the new device that enables the new device to detect in-view status of content being displayed by a screen of the new device and respond to queries from other devices that request the in-view status of the content. In some instances, provisioning may further include transmitting an instance of a ID-graph system to the new device such that each participating device of the local area network may operate an near identical instance of the ID-graph system. In those instances, the in-view status of particular content may be stored within each instance of the ID-graph system enabling some queries to be executed against a local data store of a device.

When the first device operates an instances of the ID-graph system centrally within the local area network (e.g., the first device is the only device operating an instance of the ID-graph system), each device of the local area network may transmit an identification of content that is in-view on the device to the first device either upon request from the first device, a request from another device of the local area network, or in regular intervals (e.g., such as periodically, each time new content is in-view for a particular duration of time, when particular content is in-view, or the like). For example, the first device may receive requests for in-view data and/or profile data from other devices within the local area network and transmit the requests to particular devices. The first device may then receive the in-view data from the particular devices and forward the in-view data to the requesting device. Alternatively, the first device may transmit instructions to the particular devices to transmit the in-view data directly to the requesting device. In some instances, the first device may transmit push notifications to devices that subscribe to or otherwise request in-view data associated with a particular device of the local area network or particular content.

In other instances, the ID-graph system may operate decentrally in which an instance of the ID-graph system or a portion thereof may operate on each device of the local area network that is configured to share in-view information. In those instances, each new device added to the local area network may be provisioned with an instance of the ID-graph system or a portion thereof. Each instance of the ID-graph system store one or more profiles (e.g., each profile indicating an association between the device and one or more other devices operated by a same user or entity) and share at least some of the profile information and in-view information with devices within the local area network that are associated with a same profile. The instance of the ID-graph system of each device may be synchronized with the instances of the ID-graph system operating on other devices.

For instance, when a device detects a new in-view data (e.g., indicating at least a portion of content is being displayed on a screen of the device), the device may transmit a push notification (or the like) to other devices of the local area network that share a same profile with the new in-view data such that each device maintains the in-view data detected the other devices of the local area network that share a same profile.

Alternatively, each instance of the ID-graph system may only synchronize profile information of the devices of the local area network and each device may store its own in-view data locally in a data store of the device. A device may transmit a query to other devices associated with a same profile for in-view data. The receiving devices may then transmit a response that includes the requested in-view data.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
   transmitting, from a user device and to a web server, a request for webpage content of a webpage;
   receiving, from the web server and at the user device, one or more response communications that includes the webpage content, embedded content, and a script;
   retrieving, from a locally stored data object of the user device, a device identifier initially generated by a remote system;
   detecting, using the script, that the embedded content has not been presented within a portion of the webpage that is displayed on a screen of the user device;
   transmitting a report communication to a remote ID-graph system, the report communication including a profile identifier and an indication that the embedded content has not been presented within the portion of the webpage that was displayed on the screen of the user device;
   receiving, from the web server, other embedded content; and
   modifying one or more webpage files to replace the embedded content with the other embedded content.

2. The method of claim 1, wherein:
   a first response communication of the one or more response communications is transmitted at a first time and includes the script; and
   a second response communication of the one or more response communications is transmitted at a second time after the first time and includes the embedded content, wherein the embedded content corresponds to a type of content recently or currently presented on another screen of another user device, wherein an identifier of the other user device and the device identifier are both linked to a same profile identifier, a profile associated the profile identifier is stored at a data store controlled by the remote ID-graph system.

3. The method of claim 1, wherein modifying the one or more webpage files includes:
   modifying, while the portion of the webpage is being displayed on the screen of the user device, webpage-configuration data at the user device to replace the embedded content with the other embedded content.

4. The method of claim 1, further comprising:
   detecting, at a first time, that at least part of the other embedded content is being presented within the webpage that is displayed on the screen of the user device;
   detecting, using the script and at a time subsequent to the first time, that a same or different at least part of the other embedded content is being presented within the webpage that is displayed on the screen of the user device; and
   transmitting, at least in part as a result of execution of the script, another report communication to the remote ID-graph system that includes the device identifier and another indication that the same or different at least part of the other embedded content has been presented.

5. The method of claim 1, further comprising:
detecting that a portion of the other embedded content is being presented within the webpage that is displayed on the screen of the user device;
transmitting another report communication to the remote-ID graph system, wherein the other report communication includes:
a portion of the embedded content that was detected as being presented within the portion of the webpage that is displayed on the screen of the user device;
a duration during which any of the embedded content was detected as being presented within the portion of the webpage that is displayed on the screen of the user device; and/or
a duration during which at least a predefined portion was detected as being presented within the portion of the webpage that is displayed on the screen of the user device.

6. The method of claim 1, wherein the report communication further identifies:
a portion of the webpage content that was detected as being presented within the portion of the webpage that is displayed on the screen of the user device;
a duration during which any of the webpage content was detected as being presented within the portion of the webpage that is displayed on the screen of the user device; and/or
a duration during which at least a predefined portion was detected as being presented within the portion of the webpage that is displayed on the screen of the user device.

7. The method of claim 1, wherein:
the other embedded content is selected based at least in part on an identification of television content that was presented on a television device remote from the user device, the television content being associated with the profile identifier; and
the television content, before being associated with the profile identifier, was at least one of: categorized by content type, marked with a date, and/or marked with a duration.

8. The method of claim 1, wherein the other embedded content was selected based at least in part on information gathered from another device after the embedded content was received.

9. An electronic device comprising:
one or more processors; and
a computer-readable storage medium containing instructions, that, when executed by the one or more processors, cause the one or more processors to perform operation including:
transmitting, from a user device and to a web server, a request for webpage content of a webpage;
receiving, from the web server and at the user device, one or more response communications that includes the webpage content, embedded content, and a script;
retrieving, from a locally stored data object of the user device, a device identifier initially generated by a remote system;
detecting, using the script, that the embedded content has not been presented within a portion of the webpage that is displayed on a screen of the user device;
transmitting a report communication to a remote ID-graph system, the report communication including a profile identifier and an indication that the embedded content has not been presented within the portion of the webpage that was displayed on the screen of the user device;
receiving, from the web server, other embedded content; and
modifying one or more webpage files to replace the embedded content with the other embedded content.

10. The electronic device of claim 9, wherein:
a first response communication of the one or more response communications is transmitted at a first time and includes the script; and
a second response communication of the one or more response communications is transmitted at a second time after the first time and includes the embedded content, wherein the embedded content corresponds to a type of content recently or currently presented on another screen of another user device, wherein an identifier of the other user device and the device identifier are both linked to a same profile identifier, a profile associated the profile identifier is stored at a data store controlled by the remote ID-graph system.

11. The electronic device of claim 9, wherein modifying the one or more webpage files includes:
modifying, while the portion of the webpage is being displayed on the screen of the user device, webpage-configuration data at the user device to replace the embedded content with the other embedded content.

12. The electronic device of claim 9, wherein the operations further include:
detecting, at a first time, that at least part of the other embedded content is being presented within the webpage that is displayed on the screen of the user device;
detecting, using the script and at a time subsequent to the first time, that a same or different at least part of the other embedded content is being presented within the webpage that is displayed on the screen of the user device; and
transmitting, at least in part as a result of execution of the script, another report communication to the remote ID-graph system that includes the device identifier and another indication that the same or different at least part of the embedded content has been presented.

13. The electronic device of claim 9, wherein the operations further include:
detecting that a portion of the other embedded content is being presented within the webpage that is displayed on the screen of the user device;
transmitting another report communication to the remote-ID graph system, wherein the other report communication includes:
a portion of the embedded content that was detected as being presented within the portion of the webpage that is displayed on the screen of the user device;
a duration during which any of the embedded content was detected as being presented within the portion of the webpage that is displayed on the screen of the user device; and/or
a duration during which at least a predefined portion was detected as being presented within the portion of the webpage that is displayed on the screen of the user device.

14. The electronic device of claim 9, wherein the report communication identifies:

a portion of the webpage content that was detected as being presented within the portion of the webpage that is displayed on the screen of the user device;

a duration during which any of the webpage content was detected as being presented within the portion of the webpage that is displayed on the screen of the user device; and/or a duration during which at least a predefined portion was detected as being presented within the portion of the webpage that is displayed on the screen of the user device.

15. The electronic device of claim 9, wherein:

the other embedded content is selected based at least in part on an identification of television content that was presented on a television device remote from the user device, the television content being associated with the profile identifier; and the television content, before being associated with the profile identifier, was at least one of: categorized by content type, marked with a date, and/or marked with a duration.

16. The electronic device of claim 9, wherein the other embedded content was selected based at least in part on information gathered from another device after the embedded content was received.

17. A non-transitory computer-readable storage medium containing instructions, that, when executed by one or more processors, cause the one or more processors to perform operations including:

transmitting, from a user device and to a web server, a request for webpage content of a webpage;

receiving, from the web server and at the user device, one or more response communications that includes the webpage content, embedded content, and a script;

retrieving, from a locally stored data object of the user device, a device identifier initially generated by a remote system;

detecting, using the script, that the embedded content has not been presented within a portion of the webpage that is displayed on a screen of the user device;

transmitting a report communication to a remote ID-graph system, the report communication including a profile identifier and an indication that the embedded content has not been presented within the portion of the webpage that was displayed on the screen of the user device;

receiving, from the web server, other embedded content; and modifying one or more webpage files to replace the embedded content with the other embedded content.

18. The computer-readable storage medium of claim 17, wherein:

a first response communication of the one or more response communications is transmitted at a first time and includes the script; and a second response communication of the one or more response communications is transmitted at a second time after the first time and includes the embedded content, wherein the embedded content corresponds to a type of content recently or currently presented on another screen of another user device, wherein an identifier of the other user device and the device identifier are both linked to a same profile identifier, a profile associated the profile identifier is stored at a data store controlled by the remote ID-graph system.

19. The method of claim 1, wherein detecting, using the script, whether at least part of the embedded content is being presented within a portion of the webpage that is displayed on a screen of the user device comprises at least one of:

detecting, using the script, a quantity or portion of pixels of the embedded content that is in view;

determining whether a browser window within which the embedded content is presented is in focus.

* * * * *

UNITED STATES PATENT AND TRADEMARK OFFICE
CERTIFICATE OF CORRECTION

PATENT NO. : 11,516,277 B2
APPLICATION NO. : 17/014689
DATED : November 29, 2022
INVENTOR(S) : Whitcher et al.

It is certified that error appears in the above-identified patent and that said Letters Patent is hereby corrected as shown below:

On the Title Page

On page 3, Column 1, under item (56) Other Publications, Line 1, delete "at" and insert -- at: --, therefor.

On page 4, Column 2, under item (56) Other Publications, Line 14, delete "at" and insert -- at: --, therefor.

In the Drawings

On sheet 4 of 4, in FIG. 4, under Reference Numeral 414, Line 2, delete "identifiers(s)" and insert -- identifier(s) --, therefor.

On sheet 4 of 4, in FIG. 4, under Reference Numeral 430, Line 2, delete "identifiers(s)" and insert -- identifier(s) --, therefor.

In the Specification

In Column 5, Line 18, delete "webpage," and insert -- webpage), --, therefor.

In Column 6, Line 46, delete "the a" and insert -- the --, therefor.

In Column 11, Line 9, delete "355," and insert -- 355. --, therefor.

Signed and Sealed this
Fifth Day of September, 2023

Katherine Kelly Vidal
*Director of the United States Patent and Trademark Office*